June 13, 1967 W. H. DUTT ETAL 3,324,516
COMPOSITE SEAM MEMBER
Original Filed Jan. 8, 1965
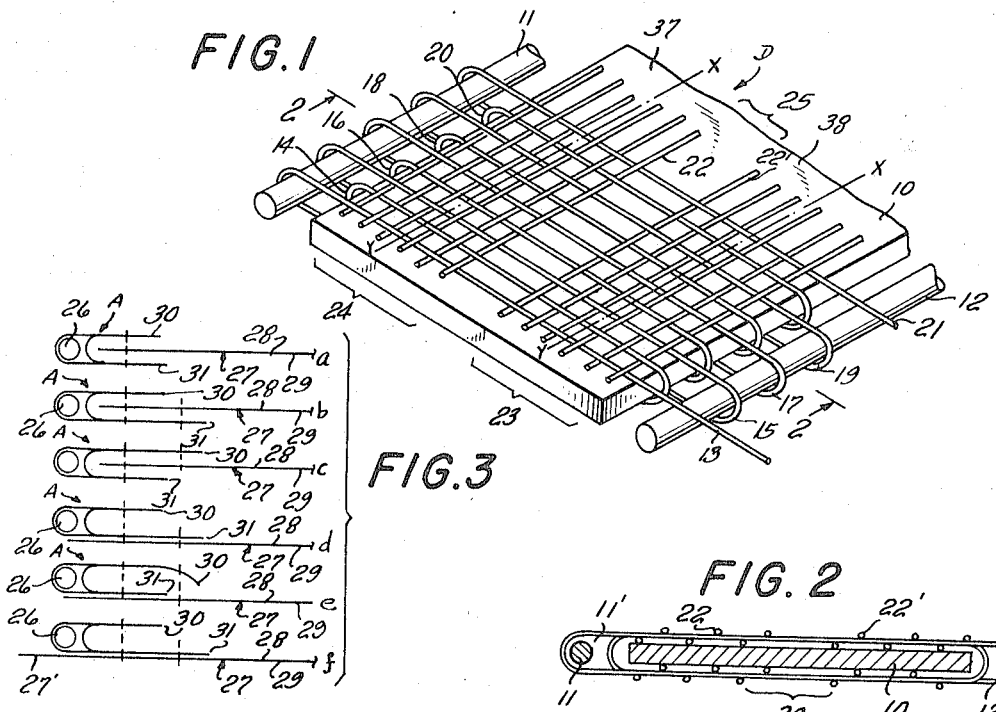
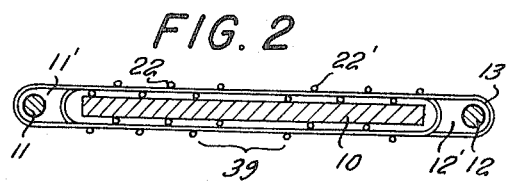
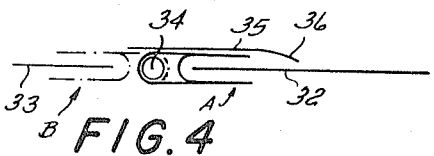
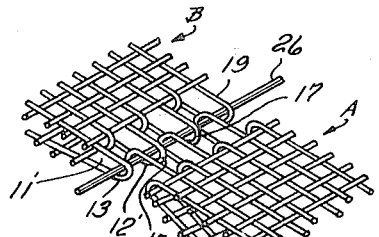
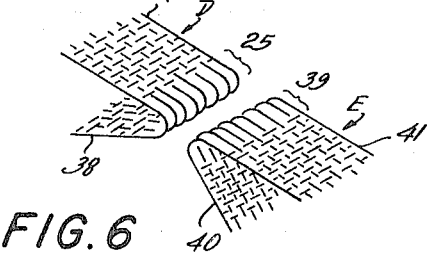
BY
Kane, Dalsimer, Kane & Smith
ATTORNEYS

United States Patent Office 3,324,516
Patented June 13, 1967

3,324,516
COMPOSITE SEAM MEMBER
William H. Dutt, Defreestville, N.Y., and Robert R. Kelleher, deceased, late of Latham, N.Y., by Marjorie V. Kelleher, executrix, Latham, N.Y., assignors to Fabric Research Laboratories, Inc., Dedham, Mass., a corporation of Massachusetts
Original application Jan. 8, 1965, Ser. No. 424,326, now Patent No. 3,283,388, dated Nov. 8, 1966. Divided and this application June 23, 1966, Ser. No. 560,018
1 Claim. (Cl. 24—33)

ABSTRACT OF THE DISCLOSURE

A composite seam member for a felt in which first and second members having alternately displaced longitudinal fill yarns to provide first and second cylinders at the ends of the respective members are attached to respective ends of the felt and a pintle is provided within said cylinders at the common axis thereof.

This application is a division of application Ser. No. 424,326, filed Jan. 8, 1965, now Patent No. 3,283,388.

Today the felts used on paper-making machinery are of a great variety, examples of which are the typically woven felts and the needled felts having a woven base. These felts are mounted in the machine in the form of a conveyor or endless belt. The felt therefore must be made endless. Some felts are actually woven endless in tubular form, whereas others are woven in rectangular form and their free ends are joined together to form the endless belt or tube. It is to this latter type that this invention is directed. Within this group are wet felts which are usually joined prior to finishing and dry felts which are joined by a hard knot, rivet, baseball seam, stand up seam or clipper seam.

Various methods of joining felt ends to form an endless felt have been utilized through the years in the history of the utilization of paper-making machinery. Recently, however, the treating of felts and the materials available from which felts are formed, such as the synthetic materials, have resulted in fabrics utilized as felts which are very strong and durable in comparison to such felts as were used in the recent past. It is necessary that the felts be of greater durability since today the machines upon which these felts are run are operated at much higher speeds than heretofore.

Through the application of the new synthetic materials and through the utilization of various treatments and finishing procedures the felts used today can be operated and used over longer periods than previously even though in today's machinery the felts are subjected to processes which have a greater tendency to deteriorate and damage the felts.

With the utilization of the chemical treatments and the synthetic materials the art has reached a degree of development that the seams or joining areas of the felts whereat the felts are joined to make them endless has become the weakest part in the felt.

Improvements of felts through the use of treatments and materials to increase felt life are of little use if the seams or point of joining the ends of the felt to make the felt endless are not durable and able to withstand deteriorating forces.

It is therefore a principal object of this invention to provide a method and means to make a strong and durable felt seam.

It is another object of this invention to provide a woven composite felt seam member to be used to join the ends of a rectangular felt to form an endless conveyor.

It is another object of this invention to provide a method of manufacturing such a composite seam member and method of fastening or attaching the seam member to the felt in functional position.

The invention will be described herein with references to the drawings, is which:

FIG. 1 is a top perspective fragmentary view of a seam member being woven in a heavy or special loom with a jacket board and edge cords in position;

FIG. 2 is a longitudinal sectional view taken along the line 2—2 in the direction of the arrows in FIG. 1;

FIG. 3 is a diagrammatic representation of several different means of fastening and positioning the composite felt seam member with respect to a felt end;

FIG. 4 is a diagrammatic representation of another arrangement of composite felt seam, constructed in accordance with the teachings of this invention, fastened to the ends of a felt to join the ends thereof to make the felt endless;

FIG. 5 is a top perspective fragmentary view of the joining of seam members with a connecting cable and using composite seam members constructed in accordance with the teachings of this invention; and FIG. 6 is an alternate form of seam member produced by the method of this invention during the same operation as the production of the first embodiment.

In the invention disclosed herein the composite seam members are woven in a loom. The warp yarns are set up for weaving in the loom in the usual manner having substantially uniform warp tension and utilizing at least four loom harnesses. A plain weave is preferred; however, within the scope of this invention a variety of weaves may be utilized. A tube is woven with the aid of a jacket board of the type indicated generally by the numeral 10 in FIG. 1 and edge cords 11 and 12. In the method, a tube is woven of the filling yarns indicated by the numeral 13 in FIG. 1 with the aid of the edge cords 11 and 12 and when the woven tube has attained suitable form jacket board 10 is inserted. The jacket board may be of the type shown in U.S. Patent No. 2,795,243, or any other suitable jacket board. It is noted that adjacent fill yarns as shown in FIG. 1 are offset so that yarns 13, 15, 17, 19 and 21 provide space to receive edge cords 11 and 12 which are disposed parallel to the edges of jacket board 10 adjacent which are yarns 14, 16, 18 and 20. With the aid of the edge cords a somewhat cylindrical area is defined at each end having a central axis substantially parallel to the direction of the warp yarns 22. The warp yarns are prepared to provide a relatively close weave in the zone 23 and 24 but to provide a substantial space between warp yarns 22 and 22' in zone 25.

After weaving, the edge cords and jacket board are removed and the fill yarns severed along the lines indicated in FIG. 1 by the letters x–y to achieve seam members A and B, as shown in FIG. 5, joined by connecting cable 26 which passes through the cylinders which were formed in weaving by the disposition of the edge cords. In order to indicate clearly in the figs. the relationship of the elements in FIG. 5, the cylinder formed by edge cord 12 is indicated in FIG. 5 by the numeral 12' while the cylinder formed by edge cord 11 is indicated by the numeral 11'. Cylinders 11' and 12' are placed upon the same central axis by the interpositioning of the fill yarns so that connecting cable 26 can pass therethrough. The connecting cable can be inserted before seam members A and B are affixed to the ends of the felt, or connecting cable 26 can be inserted after seam members A and B are affixed to the ends of the felt. In either procedure it has been found useful to stabilize the yarns around the connecting cable.

The connecting cable can be all-monofilament. It can be a monofilament formed of polyester or polyamide having a braid covering which is impregnated with polyurethane. In certain applications a plastic film formed from polyester or polyamide is placed over twisted stainless steel strands, or a braid impregnated with polyurethane can be placed over the twisted stainless steel.

Various methods of affixing seam members A and B to the ends of a felt are shown in FIGS. 3 and 4. The seam members can be placed on the felt in any suitable way, by stitching, stapling, or heat sealing for example.

In FIG. 3 a felt is shown in each of the variations indicated by the numeral 27 having an upper face 28 and a lower face 29 and in each instance seam member A is affixed to felt 27. In the views of FIG. 3 one end of member A is designated by the numeral 30 while the second end is designated by the numeral 31 and the connecting cable 26 is shown.

In FIG. 3a the seam member A is affixed to the end of felt 27 with end 31 and end 30 equidistant from the end of the felt and end 30 is affixed to face 28 of the felt while end 31 is affixed to face 29.

In FIG. 3b end 30 is affixed to face 28 of the felt and end 31 is affixed to face 29 but end 30 is affixed to the felt at a point nearer the felt end than the point at which end 31 is affixed to the felt.

In FIG. 3c end 31 is affixed to face 29 at a point closer to the end of the felt than the point at which end 30 is affixed to face 28.

In FIG. 3d end 31 is affixed to face 28 of felt 27 with end 30 affixed to the felt at a point closer to the end than is end 31.

In FIG. 3e end 31 is affixed to face 28 of felt 27 closer to the end of the felt than the point at which end 30 is affixed to face 28 so that end 30 overlaps completely end 31.

In FIG. 3f end 31 is affixed to face 28 with end 30 affixed to face 28 at a point closer the end of the felt than the point at which end 31 has been affixed thereto; however, the points at which ends 30 and 31 have been affixed to the felt are sufficiently displaced from the felt end to provide a projecting end portion 27' of the felt.

In the arrangement of FIG. 3f the felt provides a flap preventing contact of the seam juncture or connecting cable area with the mechanism upon which the felt is run.

It is seen, therefore, in FIG. 3 that various methods of attaching the seam member to the felt are available and, depending upon the particular application, the designer has a choice which does not require a variety of seam members but which can be achieved with a single seam member. In each of the applications set forth in FIG. 3 it is understood that seam member B is attached to seam member A by means of connecting cable 26 and that one of the variations shown in FIG. 3 for attaching seam member B to the remaining end of felt 27 is available.

In FIG. 4 a felt having ends indicated by the numerals 32 and 33 is shown wherein a seam member A is affixed to end 32 and a seam member B is affixed to end 33 and the seam members are joined by a connecting cable 34. An additional member 35 is attached to the end 32 of the felt at 36 with the flap member 35 overlying completely the area of joining seam members A and B and overlying completely connecting cable 34. In the arrangement of FIG. 4 the flap 35 provides protection of the undersurface of the paper being formed on the felt. This application is especially significant where very fine mesh paper is being produced and a joining such as that shown in FIG. 5 might possibly mark the paper.

It is noted by reference to FIG. 1 that the woven member is severed along the lines x—x and y—y to provide seam members A and B. The central portion or the portion between lines x—x and y—y, as shown in FIG. 1, is indicated by the letter D and provides an additional seam member which differs from seam members A and B. Seam member D is shown in FIG. 6 wherein ends 37 and 38 are overlapped to provide a knuckle within zone 25. It is noted that within the zone 25 there are no warp yarns but only filling yarns. A like seam member indicated by the letter E is available since the severing along the lines x—x and y—y has been accomplished through the whole fabric providing seam member E identical with seam member D which is not shown in FIG. 1 since it would appear beneath the jacket board. Zone 39, however, is seen in FIG. 2 and it is zone 39 which is formed as a knuckle by the overlapping of ends 40 and 41 of seam member E. In the embodiment of the invention shown in FIG. 6 it is contemplated that the fill yarns in knuckles 25 and 30 be interdisposed providing a zone for insertion of a connecting cable such as cable 26.

The seam members D and E shown in FIG. 6 can be affixed to the ends of a felt in any suitable manner and the manner of affixing these to the ends of the felt can be the same as that discussed above with respect to the seam members A and B.

The materials used in the seam members A, B, D and E can be any suitable material. It is preferred that a modified polyamide treated to make it water resistant be utilized; however, the material could be a polyester or polyamide or any other suitable material and it has been found that utilizing the same material in the connecting cable 26 as the material used in the crosswise yarns results in a connecting cable having the same expansion and contraction characteristics as the remainder of the seam members. It has also been found in certain applications to be very useful to have the materials from which the seam member is made the same as those from which the felt has been constructed. This also aids in achieving uniform expansion and contraction in the face of heat and also under tension and assures that the air permeability in the body of the felt and in the seam is approximately the same. It is not necessary, of course, that the seam members be formed of the same material as the material from which the felt is formed nor is it necessary that the connecting cable be of the same material. Also it should be noted that the flap 35 shown in FIG. 4 can be of a material different than the material from which the seam members are formed and it might be useful in a certain application to have the seam members and connecting cable formed of a material different from that of the material of the felt itself with flap 35 woven of the same material from which the felt has been constructed.

Thus, among others, the several objects in the invention, as specifically aforenoted, are achieved. Obviously, numerous changes in construction and rearrangement of parts might be resorted to without departing from the spirit of the invention as defined by the claim.

We claim:

A composite seam member for a felt comprising a first member folded upon itself, said first member having first and second alternate fill yarns displaced longitudinally, first and second knuckles formed by said first and second fill yarns respectively and providing a first portion of semi-circular cross-section having a first axis therealong, a second member folded upon itself and having third and fourth alternate fill yarns displaced longitudinally, third and fourth knuckles formed by said third and fourth fill yarns respectively and providing a second portion of semi-circular cross-section having a second axis therebetween, said first and second members being joined to respective ends of said felt with said first and third fill yarns interplaced to make coincident said first and second axes, and a pintle to be received with said first and second portions along said first and second axes.

References Cited

UNITED STATES PATENTS

| 2,629,909 | 3/1953 | Hall | 24—33 |
| 2,873,494 | 2/1959 | Santos | 24—33 |
| 2,883,734 | 4/1959 | Draper | 24—33 X |
| 3,177,539 | 4/1965 | Race | 24—33 |

FOREIGN PATENTS 1,150,028  7/1957  France.

WILLIAM FELDMAN, *Primary Examiner.*

MILTON S. MEHR, *Examiner.*